Inventor
C.W. EARP
By Philip M. Bolton
Attorney

March 5, 1957 C. W. EARP 2,784,255

KEYED FREQUENCY MODULATION CARRIER WAVE SYSTEMS

Filed Nov. 29, 1951 4 Sheets-Sheet 2

*Inventor*
C. W. EARP
By Philip M. Bolton
*Attorney*

KEYED FREQUENCY MODULATION CARRIER WAVE SYSTEMS

Filed Nov. 29, 1951

Inventor
C.W. EARP
By Philip M. Bolton
Attorney

Inventor
C. W. EARP
By Philip M. Bolton
Attorney

United States Patent Office 2,784,255

Patented Mar. 5, 1957

2,784,255

KEYED FREQUENCY MODULATION CARRIER WAVE SYSTEMS

Charles William Earp, London, England, assignor to International Standard Electric Corporation, New York, N. Y., a corporation of Delaware

Application November 29, 1951, Serial No. 258,820

Claims priority, application Great Britain January 10, 1951

3 Claims. (Cl. 179—15)

The present invention relates to electric pulse communication systems of the kind in which the pulses which are modulated by the signal wave are themselves transmitted over the communication medium by frequency modulation of a carrier wave.

In a pulse position modulation system, the signal amplitudes are commonly represented by the time deviations of corresponding unidirectional pulses from a mean time position. The modulated pulses might be transmitted directly over a wire circuit, but it is more usual to transmit them by modulation of a carrier wave. When frequency modulation is employed, it is usual to provide an oscillator generating a continuous wave at some suitable frequency and to apply each pulse to modulate the frequency of the oscillator in accordance with the amplitude of the pulse. The advantage of this arrangement is that the bandwidth necessary to reproduce the pulses is effectively smaller than would be required if the pulses were transmitted by amplitude or phase modulation of the carrier wave.

The reason for this is that although the theoretical bandwidth necessary to transmit signals by frequency modulation is greater than that necessary for amplitude modulation, because the major part of the radiated energy resides in a narrower band in the case of amplitude modulation, the band spread caused by the sharp transients associated with the leading and trailing edges of the pulses is much greater for amplitude modulation than for frequency modulation. In a similar way the band spread in the case of phase modulation is greater than in the case of frequency modulation. In frequency modulation, the amplitude of the carrier wave is constant, and the pulses only produce sharp changes of frequency of the wave, there being no sharp discontinuites in amplitude or phase.

In the case of pulse position modulation systems, the significant parameter is the time position of the pulse. In practice the time position of only one edge of the pulse is employed at the receiver, and the other edge is therefore effectively wasted. Signalling time can therefore be saved if only one edge, preferably the leading edge, is transmitted. In practice the trailing edge of a pulse usually takes more time to become established than the leading edge, and so if only the latter is transmitted, more than half the time taken up in establishing a complete pulse is saved.

A frequency modulation system has the useful property that both positive and negative changes can be easily transmitted, and advantage of this fact can be taken to save signalling time on the lines just indicated.

In telegraph systems, it has been common practice for years to transmit what are called "marking" and "spacing" signals. During marking intervals a current having given value is transmitted to the line, while during spacing intervals a current having some other given value is transmitted. The signals which really convey the information are the changes in line current which occur between the marking and spacing intervals and these changes are alternately positive and negative. The wave which is transmitted to the line is thus a series of rectangular pulses (assuming no distortion), the leading and trailing edges of which constitute the real signals.

In the frequency-shift telegraph system, the above mentioned rectangular pulses are applied to modulate the frequency of a carrier wave oscillator, so that waves of one frequency are continuously transmitted during marking periods and waves of another frequency are continuously transmitted during spacing periods.

The principal object of the present invention is to adapt the telegraphic process which has just been described to the transmission by frequency modulation of the pulses which are time position modulated by a complex signal wave, such as a speech wave. The advantage gained is that the signal representing each pulse is a frequency change in one direction only; and such a change can be established in rather less than half the time necessary for transmitting the whole pulse by the more usual method, since in that case both the build-up and decay times must be included, and the latter is usually greater than the former.

Since therefore less time is taken up in establishing the signals in the system of the present invention, it becomes possible to increase the number of channels which can be provided in a multiplex pulse system, for a given maximum time deviation, or alternatively for the same number of channels, to increase the maximum deviation, thereby improving the signal-to-noise ratio.

The object stated above is achieved according to the invention by providing a multichannel electric pulse position modulation system of communication in which a pulse train containing pulses belonging to different channels is transmitted, comprising a source of carrier waves, means for applying each pulse of the train to produce a unidirectional shift in the frequency of the carrier waves, and means for transmitting the carrier waves over a communication medium.

It should be pointed out that while in the telegraph system referred to above successive frequency shifts relate to the same signal, in the case of the present invention they relate generally to different signals.

While the invention is applicable to any pulse position modulation system, it is of particular advantage when applied to certain embodiments of the ambiguous index systems described in the specifications of my co-pending applications 257,807 filed Nov. 23, 1951 and 260,073 filed Dec. 5, 1951 both for "Electric Signal Communication Systems."

The invention will be described with reference to the accompanying drawings, in which.

In order to illustrate the invention, a six-channel pulse position modulation system will be described, but the arrangements can be adapted for any number of channels.

Figure 1:
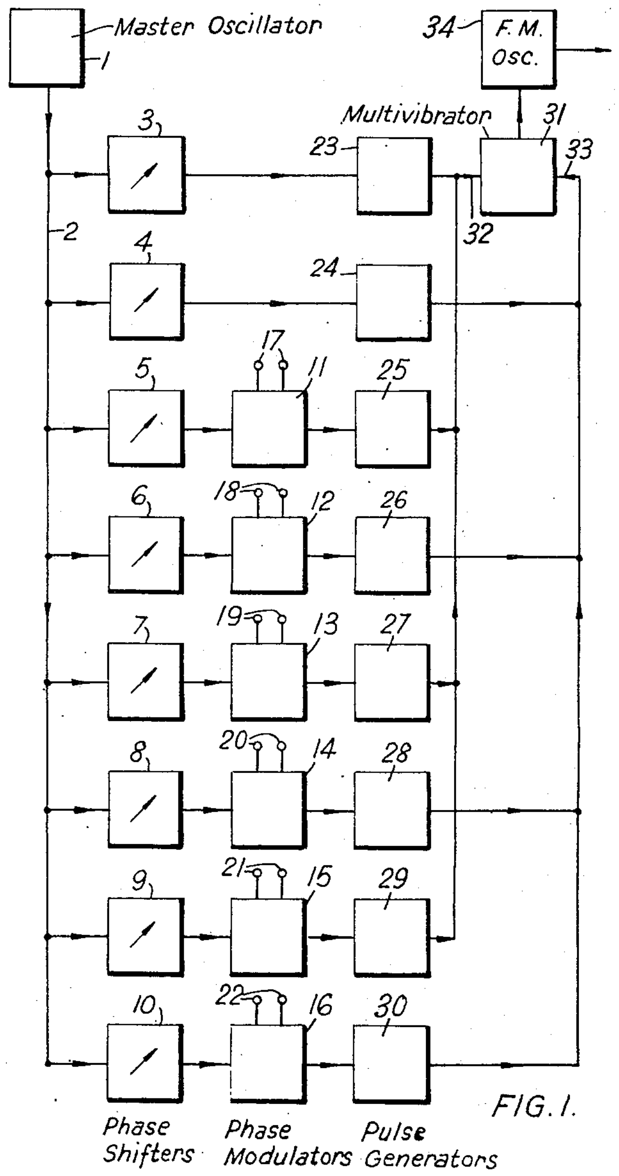
Fig. 1 shows a block schematic circuit diagram of the transmitting arrangements for a pulse position modulation system according to the invention.

The transmitting arrangements of this system are shown in Fig. 1, and comprise a master oscillator 1 which generates a frequency equal to the sampling frequency employed for each channel, which may, for example, be 10 kilocycles per second. The waves are supplied to a conductor 2 to which are connected eight similar adjustable phase shifters 3 to 10. The phase shifters 5 to 10 are connected respectively to six similar phase modulators 11 to 16, corresponding respectively to the six channels of the system. The input terminals for the corresponding channel modulating signals are designated 17 to 22.

Eight similar pulse generators designated 23 to 30 are provided. The generators 23 and 24 are connected respectively to the outputs of the phase shifters 3 and 4, and are used to produce a pair of unmodulated synchronising pulses. The remaining generators 25 to 30 are respectively connected to the outputs of the phase modulators 11 to 16 and are used to produce the position modulated pulses for channels 1 to 6 respectively. A two-condition device or multivibrator 31 is provided, of the well known type which is stable in both conditions. The pulse generators 25, 27, 29, corresponding to the odd-numbered channels, are connected to one input terminal 32 of the multivibrator, whereby each pulse switches it over from the first condition to the second condition. The pulse generators 26, 28 and 30, corresponding to the even numbered channels, are connected to the other input terminal 33 of the multivibrator, whereby each pulse from one of these generators switches it over from the second condition to the first condition. The anode potential of one of the valves in the multivibrator is applied to modulate the frequency of a carrier wave oscillator 34 the output of which is connected to a coaxial line (not shown) or a radio transmitter (also not shown) or other communication device or circuit.

The phase modulators 11 to 16 may be of any suitable known type, and the pulse generators 23 to 30 may be of the kind in which short pulses are produced by squaring and differentiating the input sine waves, and then limiting to remove all the negative differential pulses, thus producing one positive differential pulse for each cycle of the input sine wave. The positive differential pulses may have a duration about ½ microsecond, for example.

Figure 2:
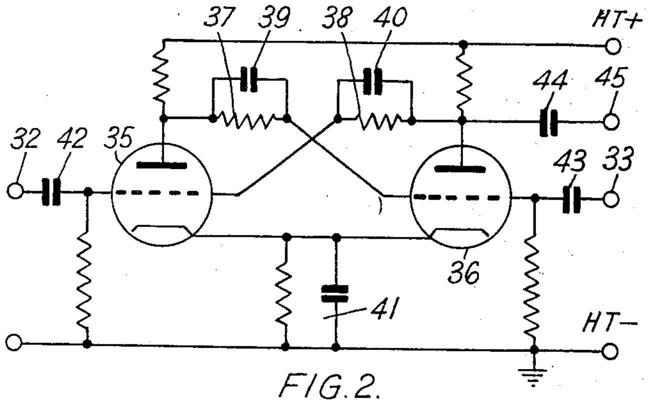
Fig. 2 shows circuit details of an element of Fig. 1.

Fig. 2 shows details of the circuit of the multivibrator 31. This comprises the valves 35 and 36, the anodes being connected respectively to the control grids of the opposite valves in the conventional manner, through resistors 37 and 38 shunted by capacitors 39 and 40. The cathodes are connected together and biased by means of a bias network 41. The input terminals 32 and 33 are connected respectively to the control grids of the valves 35 and 36 through blocking capacitors 42 and 43. The anode of the valve 36 is connected through a blocking capacitor 44 to an output terminal 45 which is connected to the oscillator 34 (Fig. 1). The normal or first condition of the multivibrator will be assumed to be that in which the valve 35 is cut off, and the valve 36 is conducting.

The operation of the circuit of Fig. 1 will be explained with reference to Fig. 3. Graph A shows the pulses supplied to the input terminal 32 of the multivibrator 31 by the odd-numbered pulse generators 23, 25, 27 and 29, and graph B shows the pulses supplied to the input terminal 33 of this multivibrator by the even-numbered pulse generators 24, 26, 28 and 30.

In graph A, pulse 46 is the first synchronising pulse produced by the generator 23, and is shown at the beginning of a sampling period, and may be suitably timed by adjustment of the phase shifter 3. This pulse is shown repeated at 47 at the beginning of the next sampling period.

The mean positions of the pulses of the odd-numbered channels are shown in graph A at 48, 49 and 50. The phase shifters 5, 7 and 9 (Fig. 1) should be adjusted so that these pulses respectively occur, for example, 16, 44 and 72 microseconds after the pulse 46.

In graph B, the second synchronising pulse produced by the generator 24 is shown at 51 and repeated at 52. The phase shifter 4 should be adjusted so that the pulse 51 is, for example, 2 microseconds after the pulse 46. The even-numbered channel pulses are shown in graph B at 53, 54 and 55. The phase shifters 26, 28 and 30 should be adjusted so that the mean positions of these pulses occur, for example, 30, 58 and 86 microseconds after the pulse 46. The six channel pulses will then be approximately evenly spaced in the interval between the second synchronising pulse 51 and the second appearance of the first synchronising pulse 47. These suggested timings are not essential, and other values could be chosen.

It has already been stated that the pulses of graph A are applied to the input terminal 32 of the multivibrator (Fig. 2). Assuming that the multivibrator is in the first or normal condition when the first synchronising pulse arrives at terminal 32, then the multivibrator will be switched into the second condition, with the valve 36 cut off. The anode voltage of the valve 36 then rises as indicated by the leading edge 56 of the first rectangular pulse shown in graph C. The synchronising pulse 51 which is applied to terminal 33 shortly after, switches the multivibrator back again, and the anode voltage drops, as indicated by the trailing edge 57. The channel pulses then follow, applied alternately to the input terminals 32 and 33 and produce in like manner the rectangular pulses 58, 59 and 60 shown in graph C.

It will be evident, therefore, that odd-numbered pulses are represented by positive-going leading edges, while even-numbered pulses are represented by negative-going trailing edges of the rectangular pulses shown in graph C. The wave C is applied to modulate the frequency of the oscillator 34 (Fig. 1), and it will be evident that an odd-numbered pulse will be signified by a change of the oscillator frequency from some value $F_1$ to a different value $F_2$, while an even-numbered pulse will be signified by a change from $F_2$ to $F_1$.

As already explained above, any leading edge or trailing edge of the rectangular pulse, graph C, will be established in something less than half the time that the corresponding channel pulse would be established, and thus an economy of the available signalling time is obtained.

Figure 3:
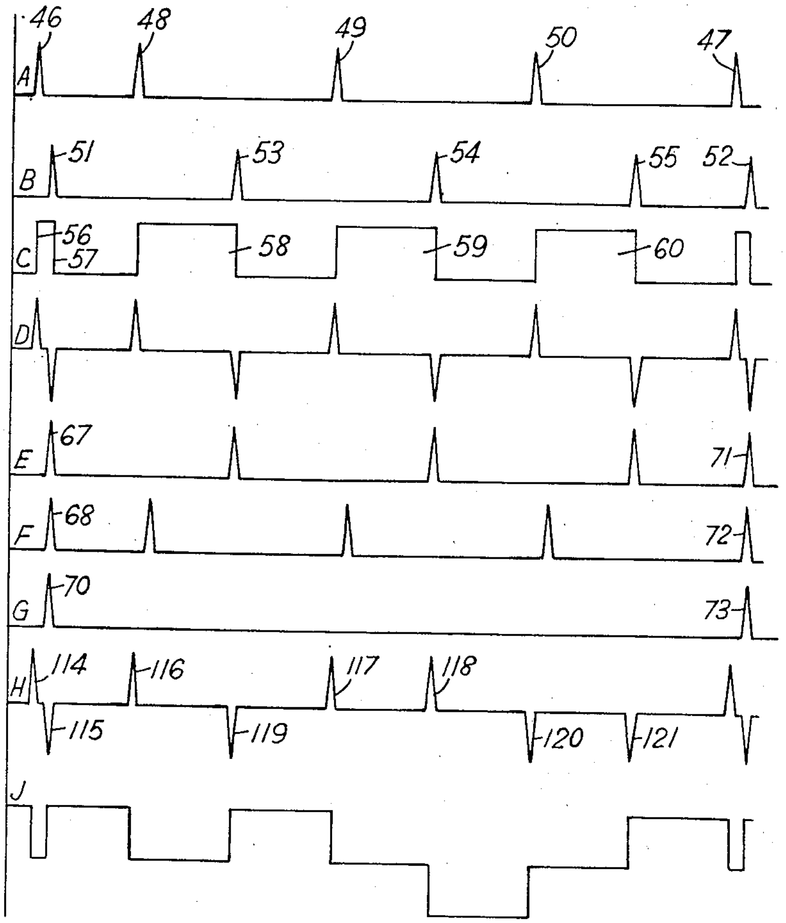
Fig. 3 shows graphical diagrams used in explaining the operation of the system.
Figure 4:
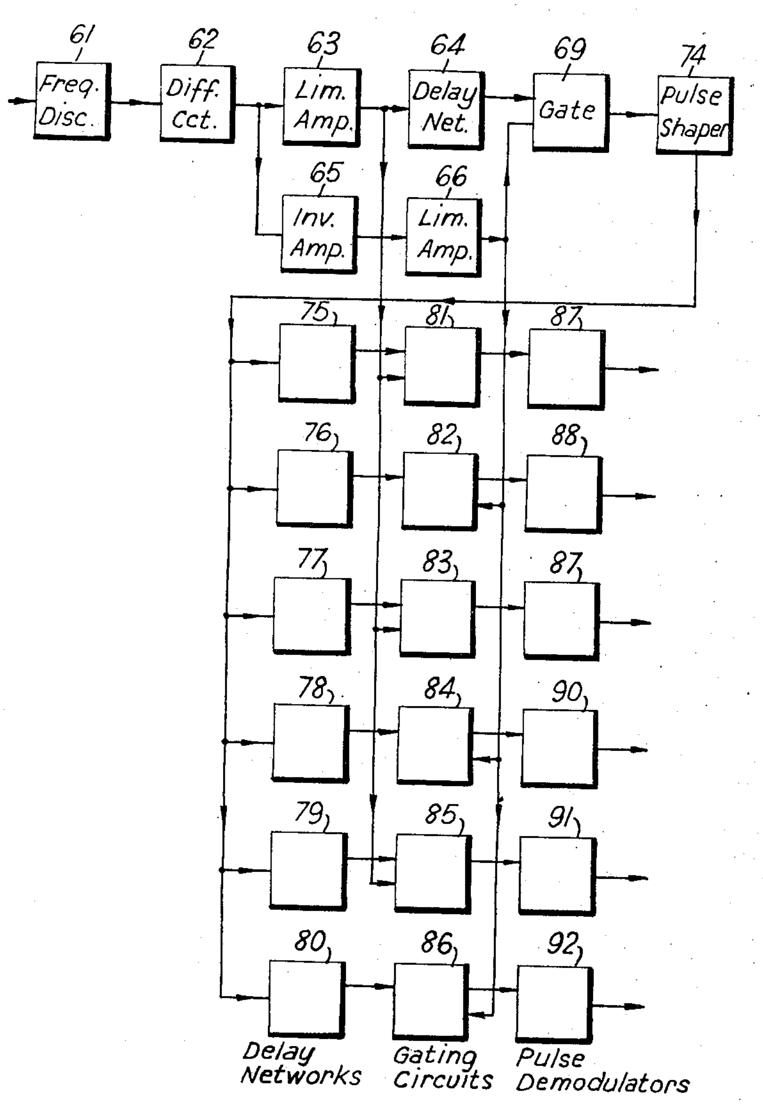
Fig. 4 shows a block schematic circuit diagram of the receiving arrangements for the system.

Fig. 4 shows the arrangements for recovering the signal waves from the frequency modulated waves produced by the oscillator 34 (Fig. 1), The waves received from the communication medium are applied to a frequency discriminator 61 of any suitable type in order to reproduce the rectangular pulses shown in graph C, Fig. 3. These are supplied to a differentiating circuit 62 which produces alternately positive and negative differential pulses as shown in graph D, corresponding respectively to the leading and trailing edges of the rectangular pulses. The differential pulses, which may have a duration of ½ microsecond, are supplied to two parallel circuits consisting respectively of a limiting amplifier 63 followed by a delay network 64 introducing a delay of 2 microseconds, and inverting amplifier 65 followed by a second limiting amplifier 66. The limiting amplifiers 63 and 66 should be designed to remove negative pulses. Graph E shows the inverted negative pulses passed by the limiting amplifier 66, which correspond to the pulses of graph B. Graph F shows the pulses at the output of the delay network 64, which correspond to the pulses of graph A, but are delayed thereafter by 2 microseconds. It will then be seen that the only pulses of graphs E and F which coincide in time are the pulses 67 and 68 corresponding respectively to the first and second synchronising pulses 46 and 51 of graphs A and B. The pulses at the outputs of elements 64 and 66 are applied to a gating circuit 69 which produces a single output pulse 70 graph G, in response to the two pulses 67 and 68. The pulses, 67, 68 and 70 are repeated at 71, 72 and 73 at the beginning of the next sampling period.

The single synchronising pulse 70 selected by the gating circuit 69 is applied to a pulse shaping circuit 74 in order to produce a gating pulse of duration equal to the maximum range of time deviation of a channel pulse, for example, 6 microseconds. This gating pulse is applied in parallel to six delay networks 75 to 80 so adjusted as to centre the gating pulse in turn in the six channel periods according to conventional practice. The delay networks 75 to 80 are connected to supply gating pulses respectively to six corresponding gating circuits 81 to 86 the outputs of which are connected respectively to six corresponding pulse demodulators 87 to 92 of conventional type from which the channel signals are obtained in the normal way.

The pulses shown in graph E (Fig. 3) at the output of the limiting amplifier 63 are applied to the gating circuits 81, 83 and 85 corresponding to the odd-numbered channels, while the pulses shown in graph F (Fig. 3) are applied to the gating circuits 82, 84 and 86 corresponding to the even-numbered channels.

It is evident that the arrangements which have been described can be extended to any even number of channels by supplying the necessary additional channel apparatus and adjusting the timing accordingly. Since it is necessary that graphs A and B should have the same number of pulses, in the event of an odd number of channels being required a third synchronising pulse may be generated at the transmitter. Thus suppose that the channel pulse 55, graph B is not required, an additional synchronising pulse (not shown) could be generated, say 2 microseconds earlier than the pulse 46. Three corresponding synchronising pulses close together would then be available at the receiver, and any two of them could be used to operate the gating circuit 69, or they could all be used to produce a triple coincidence in a suitably designed gating circuit.

It is evident that, if desired, the rectangular pulses could be obtained from the anode of the valve 35, instead of from the anode of the valve 36. In this case of course, the pulses shown in graph C (Fig. 3) would be inverted, and a corresponding inversion would need to be made in some convenient way at the receiving end.

The arrangement shown in Fig. 1 may be conveniently used for transmitting the ambiguous index pulses of the pulse position modulation system described in the Specification of said application No. 260,073. In this case the elements 25 to 30 will represent the means by which the index pulses are produced in each channel and these index pulses will be transmitted and reproduced at the receiver exactly as has been described in this specification. The arrangement however has an additional advantage. Sometimes the index pulse corresponding to a given sample of a channel signal is duplicated, and it may be desirable to eliminate the extra pulse. This elimination is automatically in the circuit of Fig. 1 because the multivibrator 31 cannot be operated a second time by a duplicated pulse applied to the same input terminal. Such a duplicated pulse has no effect and is therefore not represented in the wave shown in graph C Fig. 3.

The arrangement is also immediately applicable for transmitting the index pulses produced in the first and second embodiments described in the specification of said application No. 257,807. In this case, two or more index pulses are generated for each sample of a channel signal, and effectively, therefore, there are two or more pulse position modulation sub-channels corresponding to each signal channel. Thus in Fig. 1, each of the elements 25 to 30 represents the index pulse generating means of one of these sub-channels, and it is clear that the arrangement will convey the index pulses without any modification. It will be noted that in the case where two index pulses are used, these two pulses will respectively produce frequency shifts in opposite series.

The specification of said application No. 260,073 also describes an embodiment in which although only one index pulse is used to represent each sample of the signal wave, such index pulses can be of either sign, and the signs of a series of successive index pulses corresponding to different channels may be completely random. In such a case as this, the multivibrator 31 in Fig. 1 must evidently be replaced by something different, which will not only respond to pulses of either sign, but will give a response from which the sign of the pulse can be identified.

Figure 5:
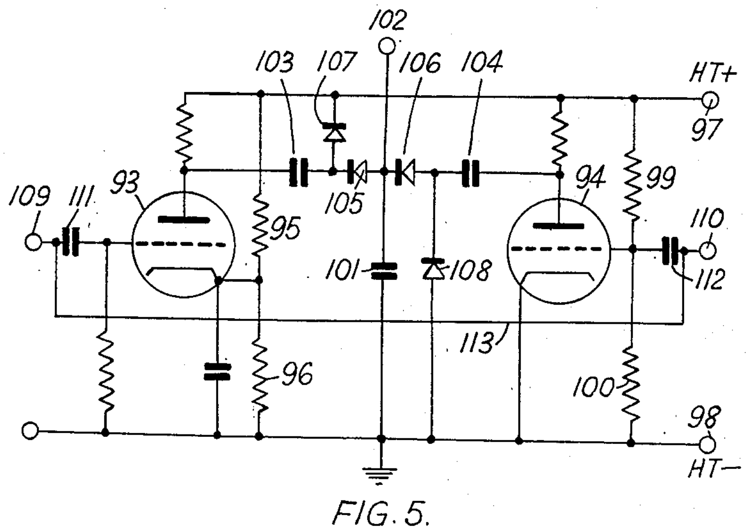
Fig. 5 shows circuit details of another form of the above mentioned elements of Fig. 1.

Fig. 5 shows details of an integrating device to replace the multivibrator 31 in the case where the channel pulses can be of either sign. It comprises two valves 93 and 94 corresponding respectively to positive and negative pulses. The valve 93 is biased below cut-off by the resistances 95 and 96 connected in series between the high tension terminals 97 and 98, the junction point of the resistance being connected to the cathode. The control grid of the valve 94 is biased positively by connection to the junction point of the resistances 99 and 100 also connected between terminals 97 and 98, so that this valve is near saturation.

A storage capacitor 101 is connected between an output terminal 102 and ground, and this terminal is also connected to the anodes of the valves through blocking capacitors 103 and 104 and rectifiers 105 and 106 in the manner indicated. The junction point of elements 103 and 105 is connected to terminal 97 through a third rectifier 107 and the junction point of elements 104 and 106 is connected to ground through a fourth rectifier 108. Input terminals 109 and 110 are connected through blocking capacitors 111 and 112 to the control grids of the valves 93 and 94. The input terminals 109 and 110 are also connected together over conductor 113. This means that all the elements 23 to 30 (Fig. 1) deliver pulses to both the input terminals simultaneously. The terminal 102 should be connected to the oscillator 34 (Fig. 1). The four rectifiers 105, 106, 107, 108 should be directed as shown, so that they are all biased to the high resistance condition by the high tension source.

At the commencement of the operation, the storage capacitor 101 will be charged to a potential about half that of the high tension source. Suppose that the first pulse to arrive is a positive pulse. The valve 94 will be unaffected, but the valve 93 will be momentarily unblocked and a negative output pulse will be obtained from the anode. The negative-going leading edge partially discharges the storage capacitor 101 through the rectifier 105, but the positive-going trailing edge is short-circuited by the rectifier 107. The potential of the capacitor 101 is thereby suddenly decreased by one step. If a negative pulse now follows, it will block the valve 94 without affecting valve 93, and the positive going leading edge of the anode pulse will recharge the capacitor 101 so that it assumes its original potential, and the negative going trailing edge will be short circuited by the rectifier 108. A succession of positive and negative pulses will cause the potential of this capacitor 101 alternately to decrease and increase. Sometimes, however, two positive or two negative index pulses may arrive in succession, in which case the potential of the capacitor 101 will change twice in the same direction. The wave obtained from the terminal 102 will therefore be a stepped rectangular wave, and each vertical edge of a step indicates a positive or a negative pulse according as it corresponds to a decrease or to an increase of potential of the capacitor 101.

Generally, of course, the number of positive pulses received by the circuit of Fig. 5 will be equal to the number of negative pulses over a long period, so that the mean potential of the storage capacitor 101 will not depart very much from half the high tension potential. The circuit is, however, self adjusting in the sense that if several pulses all of the same sign should occur in succession the changes in potential of the capacitor 101 will cause each successive step in the same direction of the output wave to be smaller than the last, so that the mean potential will not depart much from the proper value.

Referring now to Fig. 3, graph H shows a series of index pulses in a six-channel system of the kind in which in each channel a signal sample is represented by a single ambiguous index pulse which may be either positive or negative. When the present invention is applied a pair of synchronising pulses 114 and 115 will be used, similar to 46 and 51 (graphs A and B) except that they are of opposite signs. They can be produced by the devices 3, 4, 23 and 24 of Fig. 1 by arranging so that the pulse generators 23 and 24 produce pulses of opposite signs. The elements 25 to 30 will be supposed to represent the corresponding elements for producing the ambiguous index pulses as described in the specification of said application No. 260,073. Then these index pulses are shown in graph H, pulses 116, 117, 118 being positive and 119, 120 and 121 being negative.

Graph J shows the wave produced by the integrator shown in Fig. 5 which replaces the multivibrator 31 in Fig. 1. As explained above, this wave will have negative-going boundary edges corresponding to positive index pulses, and positive-going boundary edges corresponding to negative index pulses.

It is emphasised that graph H only represents one possibility for the distribution of the channel pulses; any succession of positive and negative pulses can occur. For example sometimes there may be more than two pulses in succession which are of the same sign.

In order to recover the pulses from the frequency modulated wave, Fig. 4, may be used, but the discriminator 61 should be connected to produce the inverse of the wave shown in graph J, Fig. 3, so that the differentiating circuit 62 will produce the pulses, graph H without inversion Fig. 4 should also be slightly modified, so that the pulses at the output of the limiting amplifier 63 are applied to all the gating circuits 81 to 86, Fig. 4, the pulses at the output of the limiting amplifier 66 not being used in this case. The only other modification is that the gating circuits 81 to 86 should be of a type which will accept input pulses of either sign when they have been opened by a gating pulse, and should give output pulses of corresponding signs. An example of such a gating circuit is shown in Fig. 8 of the specification of said application No. 260,073.

Referring to Fig. 3, it will be seen that the rectangular pulses of the control wave shown in graph C have leading and trailing edges corresponding respectively to odd and even-numbered pulses of the combined train produced by the elements 23 to 30 of Fig. 1. The control wave of graph J, however, consists of rectangular steps, rather than of pulses, and the vertical edges of the steps cannot be clearly said to be either leading or trailing edges. However, each of these edges corresponds to one of the pulses of graph H and may be called for convenience a "boundary edge," which term will also be understood to include leading or trailing edges in cases such as graph C where they can be separately identified.

While the principles of the invention have been described above in connection with specific embodiments and particular modifications thereof, it is to be clearly understood that this description is made only by way of example and not as a limitation on the scope of the invention.

What I claim is:

1. A multichannel electric pulse position modulation system of communication in which successive transmitted pulses belong to different channels, comprising a source of carrier waves, means for producing a wave the amplitude of which varies in steps, means for causing pulses of one channel to produce only steps increasing in a positive sense, means for causing pulses of another channel to produce only steps increasing in a negative sense, means for causing the resultant wave to frequency modulate said carrier waves with a frequency shift in one sense only in response to steps increasing in a positive sense and a frequency shift in the opposite sense only in response to steps increasing in a negative sense.

2. A multichannel pulse communication system comprising means for producing a train of multichannel pulses time modulated in accordance with the signals of different channels, the pulses being of constant amplitude, a source of carrier waves, means for producing from said train of pulses a wave having steps in which each step corresponds to one pulse, means for producing from certain pulses steps going in only one direction means for producing from other pulses steps going only in the opposite direction, and means for frequency modulating said carrier waves in accordance with said stepped wave.

3. A multichannel pulse communication system comprising means for producing a train of multichannel pulses modulated in accordance with the signals of different channels, the pulses being of constant amplitude, a source of carrier waves, means for producing from said train of pulses a stepped wave in which each step corresponds to one pulse, the steps going in one direction corresponding to pulses of certain channels, the steps going in the opposite direction corresponding to pulses of other channels, and means for frequency modulating said carrier waves in accordance with said stepped wave, said means for producing a stepped wave comprising means for segregating the odd and even numbered pulses of the pulse train into corresponding separate pulse trains, a two condition trigger device, means for applying the pulses of one of the said separate pulse trains to switch the trigger device from the first to the second condition, means for applying the pulses of the other separate pulse train to switch the trigger device from the second to the first condition, and means for deriving the stepped wave from the trigger device.

References Cited in the file of this patent

UNITED STATES PATENTS

| | | |
|---|---|---|
| 2,498,678 | Grieg | Feb. 28, 1950 |
| 2,536,654 | Miller | Jan. 2, 1951 |
| 2,541,076 | Labin et al. | Feb. 13, 1951 |
| 2,567,203 | Golay | Sept. 11, 1951 |
| 2,607,035 | Levine | Aug. 12, 1952 |